United States Patent [19]

Fantini Muzzarelli

[11] 4,355,844
[45] Oct. 26, 1982

[54] SKELETAL LOAD-BEARING STRUCTURES FOR MOTOR VEHICLES

[75] Inventor: Marco Fantini Muzzarelli, Florence, Italy

[73] Assignee: Fiat Auto S.p.A., Turin, Italy

[21] Appl. No.: 125,388

[22] Filed: Feb. 28, 1980

[30] Foreign Application Priority Data

May 25, 1979 [IT] Italy .................. 68124 A/79

[51] Int. Cl.³ .............................. B62D 21/02
[52] U.S. Cl. .................... 296/205; 280/784; 403/174
[58] Field of Search .............. 280/781, 782, 784, 785, 280/798, 801; 244/117 R, 119; 403/172, 174, 176, 205, 403, 310, 311, 178; 296/205, 204, 208, 27

[56] References Cited

U.S. PATENT DOCUMENTS

| D. 149,830 | 6/1948 | Nelson | 280/798 X |
|---|---|---|---|
| 1,020,123 | 3/1912 | Brampton et al. | 403/174 X |
| 2,257,665 | 9/1941 | Almdale | 280/800 X |
| 2,325,900 | 8/1943 | Anderson | 244/117 R |
| 2,809,050 | 10/1957 | Bauer | 280/798 X |
| 2,901,266 | 8/1959 | Lindsay | 280/785 |
| 3,860,258 | 1/1975 | Feustel et al. | 280/798 X |
| 3,971,588 | 7/1976 | Bauer | 280/784 X |
| 4,045,075 | 8/1977 | Pulver | 280/798 X |
| 4,095,819 | 6/1978 | Schaper | 280/784 |

FOREIGN PATENT DOCUMENTS

| 476330 | 11/1931 | Fed. Rep. of Germany | 296/205 |
|---|---|---|---|
| 2328716 | 12/1974 | Fed. Rep. of Germany | 280/798 |
| 36030 | 12/1958 | Poland | 296/205 |
| 477551 | 1/1938 | United Kingdom | 280/781 |

Primary Examiner—David M. Mitchell
Attorney, Agent, or Firm—Sughrue, Mion, Zinn, Macpeak & Seas

[57] ABSTRACT

A skeletal load-bearing structure for a motor vehicle includes a plurality of tubular girders joined together by connectors. Each girder and each connector is composed of at least two shell elements of thin sheet metal provided with longitudinal flanges by means of which the shell elements are joined together. Each connector shell element has a plurality of smoothly merging arm portions which together with corresponding portions of the other shell elements of the same connector form a plurality of tubular connection stubs to which respective ones of said girders are connected.

8 Claims, 5 Drawing Figures

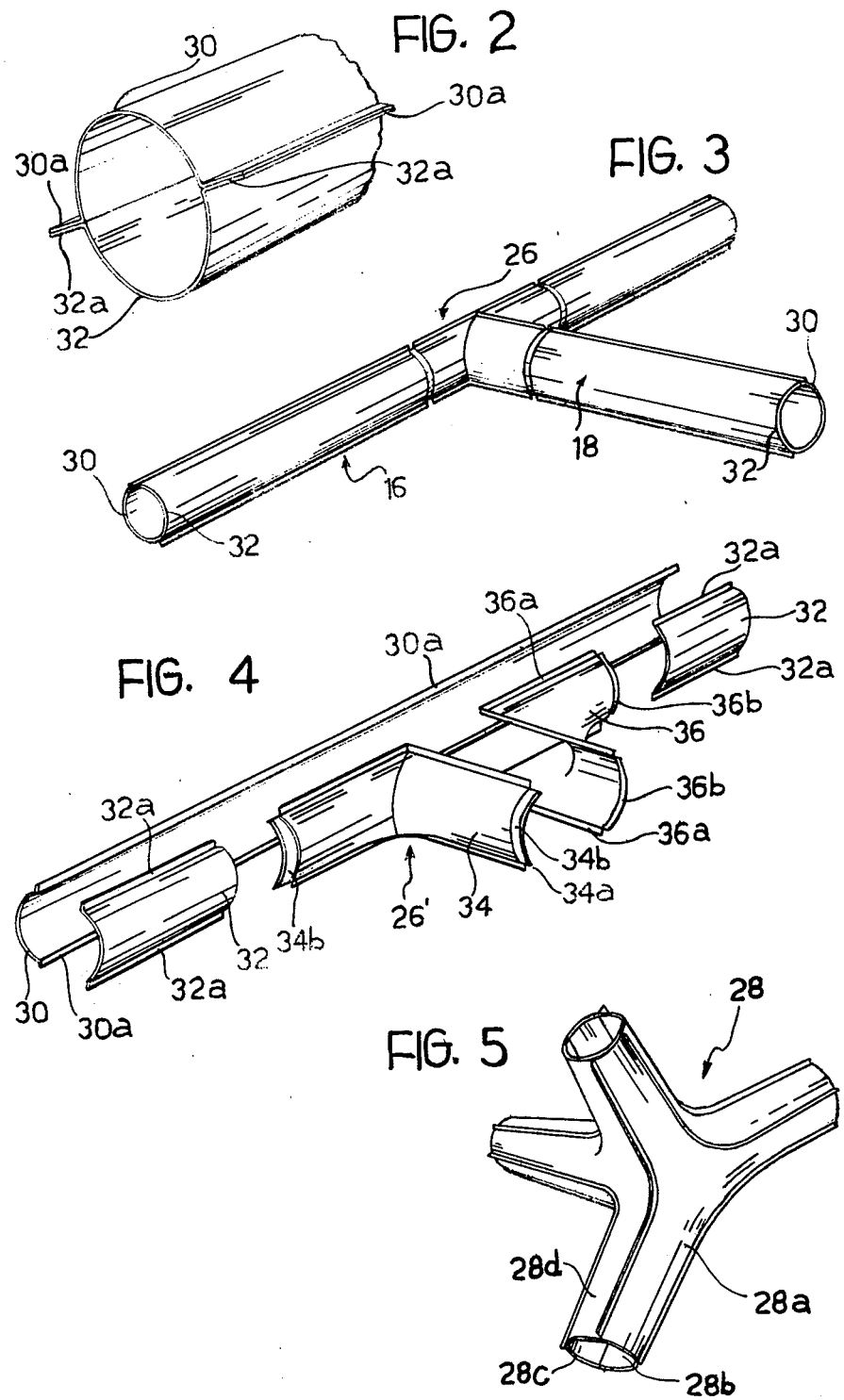

SKELETAL LOAD-BEARING STRUCTURES FOR MOTOR VEHICLES

The present invention relates to a load-bearing skeletal structure for a motor vehicle, the structure including a plurality of girders connected together at nodes by means of connectors to form a cross-linked structure.

In known load-bearing structures of the type indicated above, the girders generally consist of open-sectioned, shaped metal sheets or of steel tubes of considerable thickness and hence weight. It is an object of the present invention to provide a skeletal load-bearing structure which has a smaller weight while still possessing a high rigidity, strength, and capacity to absorb knocks, and which will also be easy and economical to manufacture.

This object is achieved in accordance with the present invention by the provision of a load-bearing structure of the type indicated above, in which:

each girder comprises at least two shell elements of thin sheet metal provided with longitudinal flanges by means of which the shell elements are joined together so as to form a tube having a constant cross-section and a substantially circular profile, and each connector comprises at least two shell elements of thin sheet metal provided with longitudinal flanges and connected together by the joining of the flanges along at least part of the their extent, each connector shell element having a plurality of arm portions which together with corresponding portions of the other shell elements of the same connector form a plurality of tubular connection stubs to which respective ones of said girders are connected, the arm portions of each connector shell element merging smoothly with each other across substantially their entire width.

The load-bearing structure of the invention thus consists of modular elements of reduced weight which can easily be assembled together and which can be readily adapted to form a wide variety of structures of different shapes and sizes. As compared with the sharp-cornered connectors of known load-bearing structures, the connectors of the invention with their smoothly merging arm portions ensure high rigidity and strength while considerably reducing the danger of yielding due to instability of the walls.

A skeletal load-bearing structure embodying the invention will now be particularly described, by way of example, with reference to the accompanying diagrammatic drawings, in which:

FIG. 2 is a perspective view on an enlarged scale of part of a girder of the structure illustrated in FIG. 1;

FIG. 3 is a perspective view to an enlarged scale of a three-way connector of the FIG. 1 structure;

FIG. 4 is an exploded perspective view of a modified form of the FIG. 3 connector; and FIG. 5 is a perspective view to an enlarged scale of a four-way connector of the FIG. 1 structure.

Figure 1:
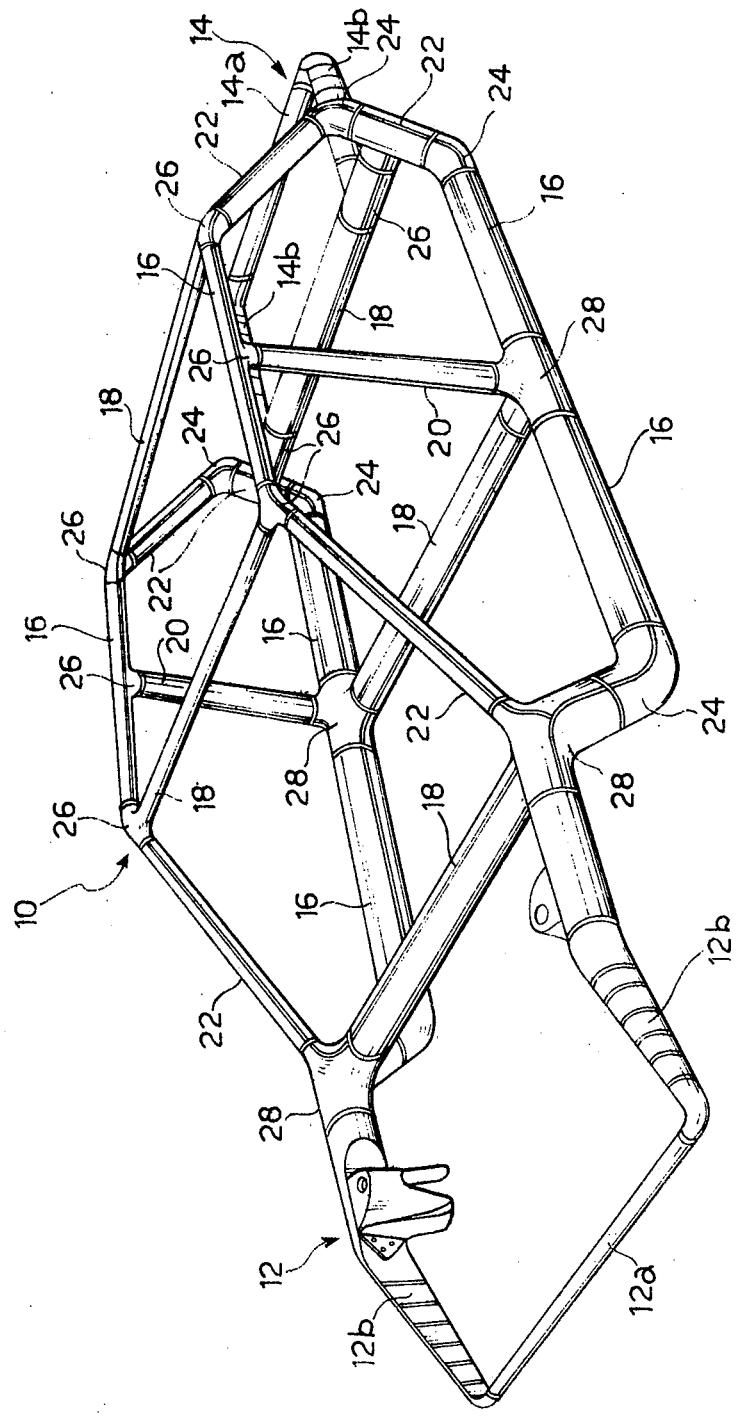
FIG. 1 is a perspective view of the load-bearing structure.

The skeletal load-bearing structure shown in FIG. 1 comprises a central portion 10 which defines the accommodation space of a vehicle, a front end portion 12 corresponding to the vehicle engine space, and a rear end portion 14 corresponding to the boot of the vehicle. The central portion 10 consists of a number of longitudinal girders 16, transverse girders 18, vertical girders 20 and diagonal girders 22 interconnected as illustrated by two-way tubular connectors 24, three-way connectors 26, and four-way connectors 28.

Each girder 16 to 22 consists of a tube of a constant circular cross-section formed from a pair of semi-cylindrical shell elements 30, 32 (FIG. 2) of thin pressed sheet metal. The two shell elements 30, 32 are provided with facing longitudinal flanges 30a, 32a by means of which the shell elements are joined together. Preferably, the flanges 30a, 32a are secured together by spot welding, seam welding, folding or glueing. Naturally, the diameters and wall thicknesses of the tubes forming the girders 16 to 22 may differ from girder to girder depending on the particular structural function of the girder. Thus, for example, the lower longitudinal girders 16 have a substantially greater diameter than the upper longitudinal girders 16.

The connectors 24 to 28 have a structure generally similar to that of the girders 16 to 22. Two possible forms of a three-way connector 26 and 26' are shown in FIGS. 3 and 4, these forms being intended for use at the girder junctions located midway along the girders 16, FIG. 5 illustrates a four-way connector 28.

The connectors 26 and 26' illustrated in FIGS. 3 and 4 each comprise a pair of thin, pressed sheet-metal shell elements 34, 36 provided with longitudinal flanges 34a, 36a by means of which the shell elements are joined together. Each shell element 34, 36 is substantially L-shaped with the two arms of the "L" merging smoothly with each other over the whole length of their line of meeting. The flanges 34a and 36a of the two facing arms of the two shell elements 34 and 36 are preferably joined together by spot-welding, seam welding, folding or glueing. The flanges 34a and 36a of the other two arms of the two shell elements 34 and 36 are joined to the longitudinal flanges 30a of the shell element 30 of one of the girders 16. In FIG. 3 the element 30 is divided into three sections and in FIG. 4 is continuous. The other shell element 32 of this girder 16 is divided into two axial sections the adjacent ends of which are connected to the outer ends of the said other two arms of the shell elements 34 and 36.

The outer ends of the arms of the two shell elements 34 and 36 have rebated extensions 34b, 36b coextensive with the curved portion of each shell element which are overlapped by the corresponding end portions of the shell elements 30 and 32 of the girders joined by the connector 26. The end portions of these shell elements 30 and 32 which overlap the connector 26 are joined thereto by spot or seam welding or by glueing.

From the foregoing, it will be appreciated that the three-way connector 26 of FIG. 3 consists of three shell elements two of which are L-shaped and the third of which is defined by a portion of one of the shell elements of a girder 16. This third shell element of the connector 26 may, however, be formed by an independent element, that is, by an element which is not part of one of the girders. The connector shell elements each effectively comprise two arms which together with the arms of the other elements, form three tubular stubs to which respective girders are connected.

The four-way connector 28 illustrated in FIG. 5 consists of four flanged triple-arm shell elements 28a, 28b, 28c and 28d connected together in a similar manner to the girders and defining four tubular stubs with rebated ends. Two of these stubs have a constant cross-section along their length, while the other two stubs have cross-sections which gradually decrease towards their respective free ends so as to allow the stubs to be connected to girders of smaller diameter. As for the three-way connector 26, the various arms of each shell element of the connector 28 merge smoothly with each other across the full width of the curved surfaces of the arms.

The front and rear end portions 12, 14 of the load-bearing structure each comprises a transverse end member, 12a, 14a respectively, connected at its ends to the central portion of the structure by means of two longitudinally-collapsible elements 12b,14b. The elements 12b and 14b are provided with transverse weakness zones and have a cross-section which decreases away from the central portion of the structure towards the corresponding transverse end member 12a, 14a.

Covering panels of sheet metal or of plastics material can be easily fixed to the described load-bearing structure to provide a completed motor vehicle body.

I claim:

1. A skeletal load-bearing structure for a motor vehicle, said structure comprising:

a plurality of girders each of which is comprised of at least two shell elements of thin sheet metal provided with longitudinal flanges, said shell elements being joined together by their flange so as to form a tube having a substantially circular profile, and a plurality of connectors joining the ends of at least two of said girders together into a unified structure, each said connector comprising at least two shell elements of thin sheet metal having a curved cross-sectional configuration and provided with respective flanges extending uninterruptedly along the longitudinal edges thereof, the said shell elements being connected together by the joining of the flanges along their extent and each said connector shell element having a plurality of arm portions which together with corresponding portions of the other shell elements of the same connector form a plurality of tubular connection stubs to which said ends of said girders are rigidly fixed; said arm portions of each connector shell element merging smoothly with each other across substantially their entire width with the ends of said connector shell elements being provided with rebated extensions coextensive only with the curved portions of said shell elements so as to permit the ends of said girder shell elements to be connected together by overlapping joints and the longitudinal flanges of the girders extending on the prolongation of the flanges of the connector shell elements forming the respective tubular connection stubs of said connectors.

2. A load-bearing structure according to claim 1, wherein the said flanges of said shell elements are connected together by means of spot-welding.

3. A load-bearing structure according to claim 1, wherein the said flanges of the said shell elements are connected together by means of glueing.

4. A load-bearing structure according to claim 1, wherein at least one said connection stub of each connector has a constant cross-sectional diameter over the length of the stub.

5. A load-bearing structure according to claim 1, wherein at least one said connection stub of a said connector has a cross sectional diameter which gradually decreases towards the free end thereof.

6. The load-bearing structure according to claim 1, wherein the said overlapping joints joining the shell elements of the connectors to the shell elements of the girders are secured by means of spot-welding.

7. A load-bearing structure according to claim 1, wherein the said overlapping joints joining the shell elements of the connectors to the shell elements of the girders are secured by means of glueing.

8. A skeletal load-bearing structure for a motor vehicle comprising a plurality of girders each of which is comprised of two semi-cylindrical shell elements of thin sheet metal provided with longitudinal flanges, said shell elements being joined together by their flanges so as to form a hollow cylindrical tube and at least one connector for joining two girders at an angle relative to each other, each said connector being comprised of two shell elements each of which is provided with two angularly related arms having a semi-cylindrical cross-sectional configuration with flanges extending uninterruptedly along the longitudinal edges thereof, said shell elements being connected together by joining the flanges of one arm of one shell element to the flanges of one arm of the other element to define a hollow cylindrical connection stub, one shell element of said girder being interrupted along the length thereof to define a gap between spaced apart ends, the flanges of the other arm of each element being connected to the flanges of the non-interrupted shell element of the girder and the ends of said other arm portions being provided with rebated extensions coextensive with the semi-cylindrical portion of the shell element so as to permit the ends of said interrupted girder shell element to be connected thereto by overlapping joints.

* * * * *